US010109268B2

(12) United States Patent
Sakata

(10) Patent No.: US 10,109,268 B2
(45) Date of Patent: Oct. 23, 2018

(54) MUSICAL NOTE GENERATION DEVICE, ELECTRONIC MUSICAL INSTRUMENT, METHOD, AND STORAGE MEDIUM

(71) Applicant: CASIO COMPUTER CO., LTD., Tokyo (JP)

(72) Inventor: Goro Sakata, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/845,805

(22) Filed: Dec. 18, 2017

(65) Prior Publication Data

US 2018/0182365 A1 Jun. 28, 2018

(30) Foreign Application Priority Data

Dec. 26, 2016 (JP) ................................ 2016-252130

(51) Int. Cl.
*G01P 3/00* (2006.01)
*G10H 1/02* (2006.01)
(Continued)

(52) U.S. Cl.
CPC ........... *G10H 1/348* (2013.01); *G10H 1/0008* (2013.01); *G10H 1/053* (2013.01); *G10H 1/08* (2013.01);
(Continued)

(58) Field of Classification Search
CPC ...... G10H 1/348; G10H 1/0008; G10H 1/053; G10H 2220/221
(Continued)

(56) References Cited

U.S. PATENT DOCUMENTS 8,729,376 B2 * 5/2014 Kakishita ................. G10H 7/02 84/622
8,754,316 B2 * 6/2014 Shimizu ................. G10H 5/007 84/626
(Continued)

FOREIGN PATENT DOCUMENTS

JP 2007-193129 A 8/2007
JP 2009-008736 A 1/2009
(Continued)

OTHER PUBLICATIONS

Zambon et al., "Simulation of Piano Sustain-Pedal Effect by Parallel Second-Order Filters", Sep. 1-4, 2008, Proc. of the 11th Int. Conference on Digital Audio Effects (DAFx-08), Espoo, Finland.
(Continued)

*Primary Examiner* — Jeffrey Donels
(74) *Attorney, Agent, or Firm* — Chen Yoshimura LLP

(57) ABSTRACT

A musical note generation device includes at least one processor that performs a process of generating attenuated sound waveform data by respectively reducing, among frequency components included in first sound waveform data corresponding to pitch information associated with a specified key, amplitudes of respective frequency components of a fundamental tone and harmonics of the fundamental tone corresponding to a pitch indicated by the pitch information; a process that convolves the generated attenuated sound waveform data generated with second sound waveform data corresponding to at least one of a high sound range side impulse response and a low sound range side impulse response, so as to generate third sound waveform data; and a process of outputting piano sound waveform data generated on the basis of the third sound waveform data generated by the convolution process.

11 Claims, 6 Drawing Sheets

(51) Int. Cl.

| | |
|---|---|
| ***G10H 1/34*** | (2006.01) |
| ***G10H 1/08*** | (2006.01) |
| ***G10H 1/12*** | (2006.01) |
| ***G10H 1/00*** | (2006.01) |
| ***G10H 1/053*** | (2006.01) |

(52) U.S. Cl.
CPC ....... *G10H 1/125* (2013.01); *G10H 2210/271* (2013.01); *G10H 2220/221* (2013.01); *G10H 2250/105* (2013.01)

(58) Field of Classification Search
USPC ......... 84/609, 626, 627, 662, 663, 720, 738, 84/745
See application file for complete search history.

(56) References Cited

U.S. PATENT DOCUMENTS

| | | | | |
|---|---|---|---|---|
| 2003/0177889 | A1 | 9/2003 | Koseki et al. | |
| 2008/0006141 | A1 | 1/2008 | Gouhara et al. | |
| 2009/0000462 | A1 | 1/2009 | Fujita | |
| 2009/0133566 | A1 | 5/2009 | Nakae | |
| 2009/0266219 | A1* | 10/2009 | Nakae | G10H 1/125 84/229 |
| 2010/0307322 | A1* | 12/2010 | Tominaga | G10H 5/007 84/622 |
| 2011/0226119 | A1 | 9/2011 | Shinoda | |
| 2012/0137857 | A1* | 6/2012 | Liu | G10H 5/007 84/622 |
| 2017/0243571 | A1* | 8/2017 | Cogliati | G10G 1/04 |
| 2018/0182364 | A1 | 6/2018 | Sakata | |

FOREIGN PATENT DOCUMENTS

| | | | |
|---|---|---|---|
| JP | 2009-025589 | A | 2/2009 |
| JP | 2009-175677 | A | 8/2009 |
| JP | 2010-117536 | A | 5/2010 |
| JP | 2011-197326 | A | 10/2011 |

OTHER PUBLICATIONS

European Search Report dated May 7, 2018, in a counterpart European patent application No. 17209236.3.
European Search Report dated May 4, 2018, in a counterpart European patent application No. 17209232.2.

* cited by examiner

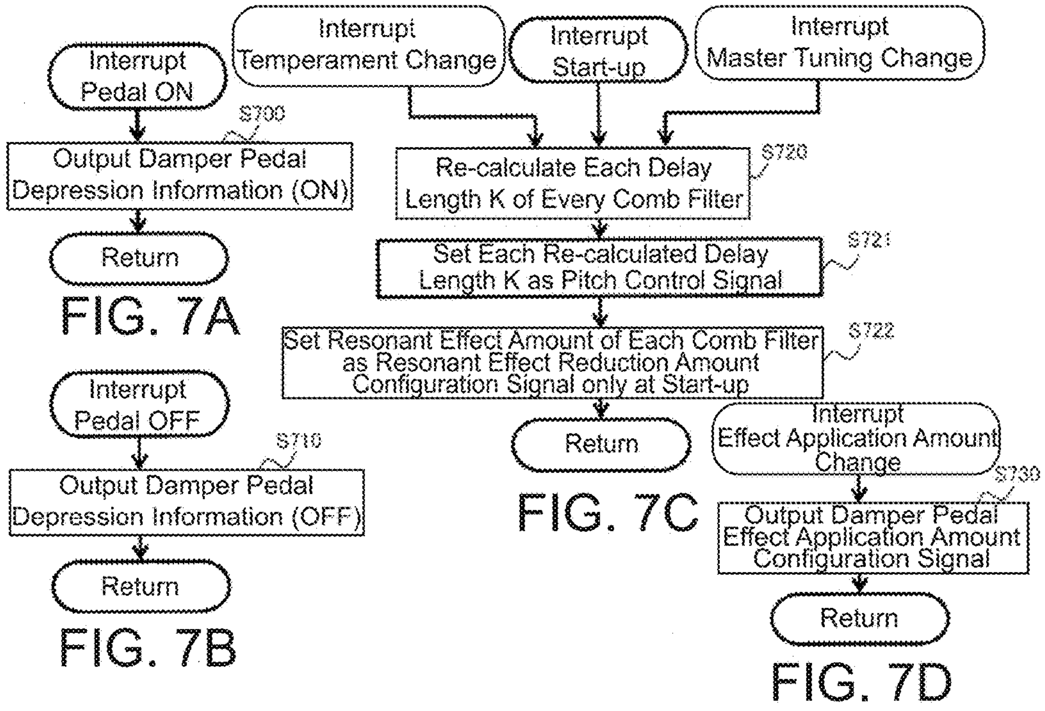
Interrupt
Pedal ON
S700
Output Damper Pedal
Depression Information (ON)
Return
FIG. 7A
Interrupt
Pedal OFF
S710
Output Damper Pedal
Depression Information (OFF)
Return
FIG. 7B
Interrupt
Temperament Change
Interrupt
Start-up
Interrupt
Master Tuning Change
Re-calculate Each Delay
Length K of Every Comb Filter
S720
Set Each Re-calculated Delay
Length K as Pitch Control Signal
S721
Set Resonant Effect Amount of Each Comb Filter
as Resonant Effect Reduction Amount
Configuration Signal only at Start-up
S722
Return
FIG. 7C
Interrupt
Effect Application Amount
Change
S730
Output Damper Pedal
Effect Application Amount
Configuration Signal
Return
FIG. 7D

MUSICAL NOTE GENERATION DEVICE, ELECTRONIC MUSICAL INSTRUMENT, METHOD, AND STORAGE MEDIUM

BACKGROUND OF THE INVENTION

Technical Field

The present invention relates to a musical note generation device, an electronic musical instrument, a method, and a storage medium.

Background Art

In an acoustic piano, when the damper pedal is not depressed, dampers arranged corresponding to the keys contact the strings while the keys are not depressed and are lifted from contact with the strings when the keys are pressed. Moreover, hammers that are actuated by pressing the keys strike the strings. Meanwhile, when the damper pedal is depressed, the dampers that provide damping for the keys are all lifted. In this state, if any of the keys are pressed and the string corresponding to that key is struck, a note corresponding to the vibration of that string is produced, and all of the other strings resonate with the vibration of that string and produce resonant tones. The vibration of the string that was struck as well as the resonance of the resonant tones continue for a long period of time even after the key is released. These resonant tones are one of the characterizing features of piano sounds.

In conventional electronic pianos, simulating the resonant tones of an acoustic piano is typically accomplished with signal processing techniques involving a combination of feedback filters such as reverbs and resonators, for example.

Moreover, one conventional example of an approach to reproducing the complex sound image profile of string resonance is the following resonant tone sound image generation device (see Patent Document 1, for example). A resonant tone generator includes string resonance circuit groups in which a plurality of string resonance circuits are grouped together. Each string resonance circuit is a digital filter having a resonant frequency corresponding to harmonics of musical notes. When a musical note signal is input by pressing a key, a string resonance signal corresponding to the musical note signal is input to a convolution operation processor and convolved with a pre-measured impulse response. The convolved string resonance signal is then synthesized by an adder and output. The respective output signals from the string resonance circuit groups are convolved with impulse responses from mutually different sound source positions defined as if to be on the bridge of an acoustic piano occupying the same space.

Patent Document 1: Japanese Patent Application Laid-Open Publication No. 2007-193129

However, in the conventional technology based on the feedback filter signal processing techniques described above, it is difficult to achieve a realistic sound equivalent to the resonant tones of an acoustic piano.

One advantage of the present invention lies in making it possible to generate natural resonant tones similar to those of an acoustic piano.

Accordingly, the present invention is directed to a scheme that substantially obviates one or more of the problems due to limitations and disadvantages of the related art.

SUMMARY OF THE INVENTION

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a musical note generation device, including: a plurality of keys, the plurality of keys respectively being associated with pitch information; and at least one processor, the at least one processor performing the following processes: an attenuated sound waveform data generation process of generating attenuated sound waveform data by respectively reducing, among frequency components included in first sound waveform data corresponding to the pitch information associated with a specified key, amplitudes of respective frequency components of a fundamental tone and harmonics of the fundamental tone corresponding to a pitch indicated by the pitch information; a convolution operation process that convolves the attenuated sound waveform data generated by the attenuated sound waveform data generation process with second sound waveform data corresponding to at least one of a high sound range side impulse response and a low sound range side impulse response, so as to generate third sound waveform data; and an output process of outputting piano sound waveform data generated on the basis of the third sound waveform data generated by the convolution operation process.

In another aspect, the present disclosure provides a musical note generation device, including: a plurality of keys, the plurality of keys respectively being associated with pitch information; and at least one processor, the at least one processor performing processes including: an attenuated sound waveform data generation process of generating attenuated sound waveform data by respectively reducing, among frequency components included in first sound waveform data corresponding to the pitch information associated with a specified key, amplitudes of respective frequency components of a fundamental tone and harmonics of the fundamental tone corresponding to a pitch indicated by the pitch information; a convolution operation process that convolves the attenuated sound waveform data generated by the attenuated sound waveform data generation process with second sound waveform data corresponding to at least one of a high sound range side impulse response and a low sound range side impulse response, so as to generate third sound waveform data; and an output process of outputting piano sound waveform data generated on the basis of the third sound waveform data generated by the convolution operation.

In another aspect, the present disclosure provides a method to be executed by a processor in an electronic musical instrument, including: an attenuated sound waveform data generation process of generating attenuated sound waveform data by respectively reducing, among frequency components included in first sound waveform data corresponding to pitch information associated with a specified key, amplitudes of respective frequency components of a fundamental tone and harmonics of the fundamental tone corresponding to a pitch indicated by the pitch information; a convolution operation process that convolves the attenuated sound waveform data generated by the attenuated sound waveform data generation process with second sound waveform data corresponding to at least one of a high sound range side impulse response and a low sound range side impulse response, so as to generate third sound waveform data; and an output process of outputting piano sound waveform data generated on the basis of the third sound waveform data generated by the convolution operation process.

In another aspect, the present disclosure provides a non-transitory storage medium having stored therein instructions that cause a processor in an electronic musical instrument to perform the following processes: an attenuated sound waveform data generation process of generating attenuated sound waveform data by respectively reducing, among frequency components included in first sound waveform data corresponding to pitch information associated with a specified key, amplitudes of respective frequency components of a fundamental tone and harmonics of the fundamental tone corresponding to a pitch indicated by the pitch information; a convolution operation process that convolves the attenuated sound waveform data generated by the attenuated sound waveform data generation process with second sound waveform data corresponding to at least one of a high sound range side impulse response and a low sound range side impulse response, so as to generate third sound waveform data; and an output process of outputting piano sound waveform data generated on the basis of the third sound waveform data generated by the convolution operation process.

It is to be understood that both the foregoing general description and the following detailed description are exemplary and explanatory, and are intended to provide further explanation of the invention as claimed.

BRIEF DESCRIPTION OF THE DRAWINGS

The detailed descriptions below are intended to be read with reference to the following figures in order to gain a deeper understanding of the present application.

FIGS. 7A to 7D are flowcharts illustrating examples of processes in the electronic musical instrument.

DETAILED DESCRIPTION OF EMBODIMENTS

Figure 1:
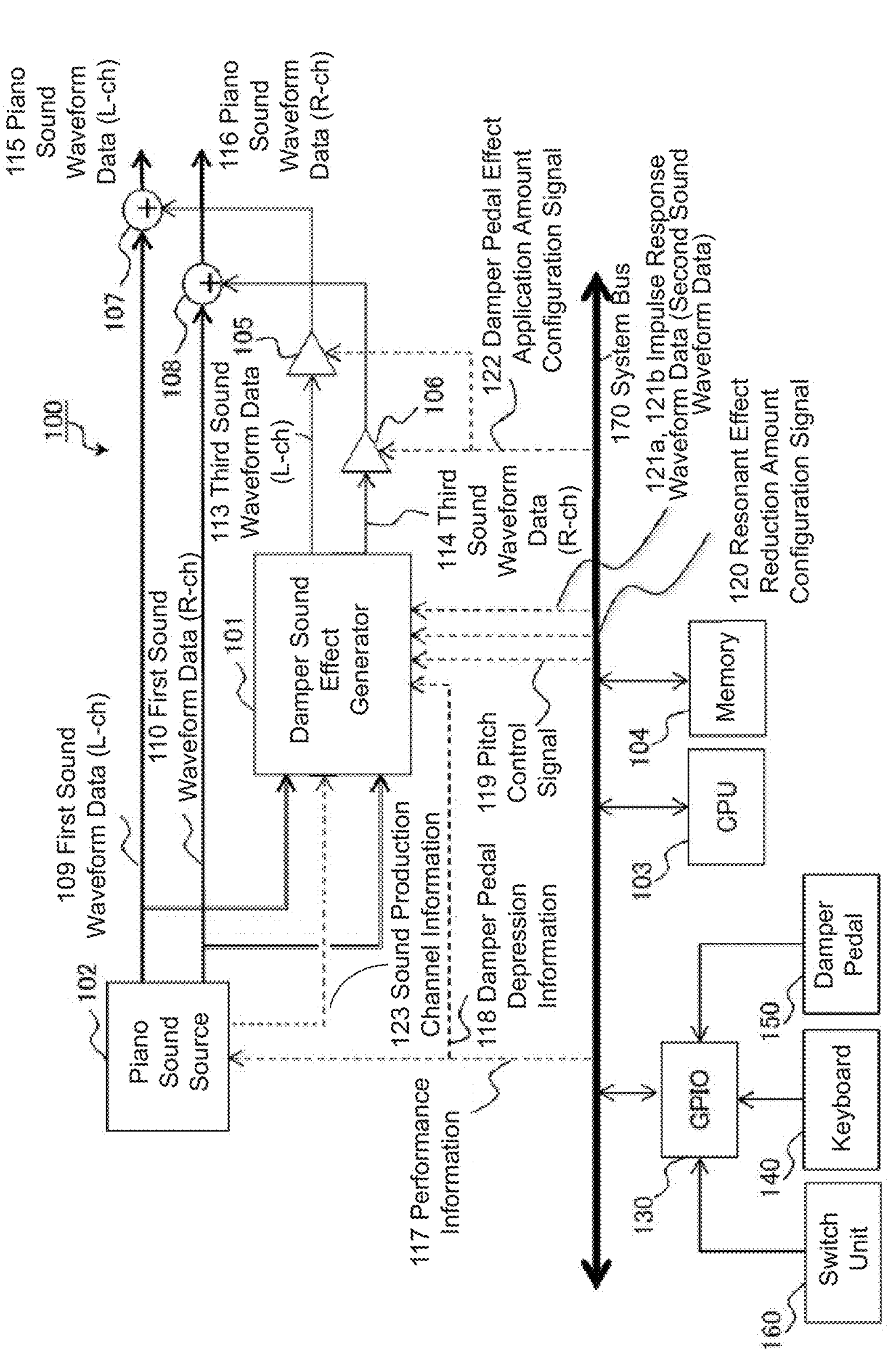
FIG. 1 is a block diagram illustrating an example of an embodiment of an electronic musical instrument.

An embodiment of the present invention will be described in detail below with reference to figures. The present embodiment relates to an electronic musical instrument that simulates an acoustic piano. Waveform data (first sound waveform data) is created by recording the sounds produced when the keys of an acoustic piano are pressed, and this data is stored in a waveform memory in a piano sound source (an integrated circuit). Then, when the keys of an electronic piano are pressed, piano sound waveform data is generated by reading the waveform data corresponding to the pitches of the pressed keys from the waveform memory.

Moreover, in the present embodiment, to simulate the resonance from string vibration that occurs when the damper pedal of an acoustic piano is depressed, impulse response waveform data (second sound waveform data) for resonant tones obtained by causing the acoustic piano to vibrate while depressing the damper pedal of the acoustic piano is recorded in advance and stored in a memory of the electronic musical instrument. Then, a convolution operation process of convolving the first sound waveform data corresponding to pressed keys with the impulse response waveform data (second sound waveform data) is performed, and resonant tone waveform data (third sound waveform data) is generated. Next, piano sound waveform data is generated by mixing together the first sound waveform data and the resonant tone waveform data (third sound waveform data) in a ratio corresponding to the amount by which the damper pedal is depressed. Then, the generated piano sound waveform data is output.

The impulse response waveform data (second sound waveform data) recorded while the damper pedal is depressed is recorded while all of the strings are in a free state; that is, a state in which all of the strings can resonate and vibrate to produce sound. Therefore, the impulse response waveform data (second sound waveform data) includes frequency characteristics for a state equivalent to when all of the strings are producing sound and also includes harmonic characteristics of strings producing sound due to keypresses. As a result, when the first sound waveform data produced from the waveform memory when a key is pressed is convolved with the impulse response waveform data (second sound waveform data) including these frequency characteristics, the waveform data components of the pitch corresponding to the keypress that are included in both types of waveform data are undesirably emphasized, which produces unnatural resonant tones.

As a countermeasure, in the present embodiment, a filtering calculation process is performed to generate attenuated sound waveform data by respectively reducing, from the frequency components included in the waveform data (first sound waveform data) produced from the waveform memory when a key is pressed, the amplitudes of the respective frequency components of the fundamental tone and harmonics of the pitch corresponding to the keypress. Then, an operation process of convolving the attenuated sound waveform data generated by the filtering calculation process with the abovementioned impulse response waveform data is performed to generate the resonant tone waveform data (third sound waveform data). In this manner, the present embodiment makes it possible to generate natural resonant tones.

Furthermore, in the present embodiment, for each set of the first sound waveform data respectively corresponding to one or more pitches respectively produced from the waveform memory in response to presses of a plurality of keys, a plurality of filtering calculation processes are performed to respectively reduce, from the frequency components included in the first sound waveform data, the amplitudes of the respective frequency components of the fundamental tones and harmonics of the pitches corresponding to the first sound waveform data. Next, an operation process is performed to convolve the attenuated sound waveform data generated by the filtering calculation processes with any one of a plurality of sets of second sound waveform data that is different from the first sound waveform data. For example, a storage unit that stores effect application factor data for a high sound range side (hereinafter, "high note side") and effect application factor data for a low sound range side (hereinafter, "low note side") of a keyboard of a piano is included, and a first convolution operation process of convolving attenuated sound waveform data multiplied by the high note side effect application factors stored in the storage unit with the second sound waveform data for the high note side among the plurality of sets of second sound waveform data, as well as a second convolution operation process of convolving attenuated sound waveform data multiplied by the low note side effect application factors stored in the storage unit with the second sound waveform data for the low note side among the plurality of sets of second sound waveform data, are performed. Finally, resonant tone waveform data (third sound waveform data) is generated by mixing together the outputs of the convolution operation processes. In this way, the present embodiment makes it possible to, regardless of which keys are pressed, output natural sounds of the type produced when a grand piano is played while depressing the damper pedal. In the present embodiment, application factors are determined from the high sound side effect application factors and the low sound side application factors. The input first sound waveform data is divided up by these application factors, and the third sound waveform data is generated after respectively performing a high sound side convolution operation process and a low sound side convolution operation process. This makes it possible to output natural sounds regardless of which keys are pressed.

Moreover, in another embodiment, the third sound waveform data may be generated by convolving the attenuated sound waveform data with any one of a plurality of sets of second sound waveform data respectively corresponding to a high sound range side impulse response and a low sound range side impulse response. In other words, when a key on the high sound range side is pressed from among the plurality of keys, a process of convolving the attenuated sound waveform data with the second sound waveform data corresponding to the high sound range side impulse response is performed, and a process of convolving the attenuated sound waveform data with the second sound waveform data corresponding to the low sound range side impulse response is not performed. Conversely, when a key on the low sound range side is pressed from among the plurality of keys, a process of convolving the attenuated sound waveform data with the second sound waveform data corresponding to the low sound range side impulse response is performed, and a process of convolving the attenuated sound waveform data with the second sound waveform data corresponding to the high sound range side impulse response is not performed. This type of embodiment may be implemented as well.

FIG. 1 is a block diagram illustrating an example of an embodiment of an electronic musical instrument 100. The electronic musical instrument 100 includes a damper sound effect generator 101, a piano sound source 102; a central processing unit (CPU) 103; a randomly accessible memory 104; multipliers 105 and 106; adders 107 and 108; a general-purpose input/output (GPIO) 130 to which a keyboard 140, a damper pedal 150, and a switch unit 160 are connected; and a system bus 170. The damper sound effect generator 101, the piano sound source 102, the multipliers 105 and 106, and the adders 107 and 108 may be implemented using a single-chip or multi-chip digital signal processor (DSP) integrated circuit, for example.

The keyboard 140 is a keyboard with which a performer inputs a piano performance and includes 88 keys, for example.

The damper pedal 150 is depressed by the performer to create an effect simulating the behavior of the damper pedal in an acoustic piano.

The switch unit 160 includes general-purpose switches such as a power switch, a volume switch, and tone color selection switches as well as a switch for specifying the amount of damper pedal effect to apply, a switch for changing the temperament, a switch for changing the master tuning, and the like.

The GPIO 130 detects keypress and key release information of the keys on the keyboard 140, ON (depressed) and OFF (not depressed) information of the damper pedal 150, and operation information of the switches in the switch unit 160 and notifies the CPU 103 of this information via the system bus 170.

The CPU 103, in accordance with control programs stored in the memory 104, executes processes for handling information received from the performer via the GPIO 130, including a process for keypress and key release information from the keyboard 140 and a process for ON/OFF information from the damper pedal 150, as well as processes triggered by operation of the switch unit 160 such as a process for power ON information, a process for volume change information, a process for tone color selection information, a process for changing the temperament, a process for master tuning change information, and a process for specifying the amount of damper pedal effect to apply, for example. As a result of these processes, the CPU 103 outputs performance information 117 that includes note-on information, note-off information, tone color selection information, temperament change information, master tuning change information, and the like to the piano sound source 102 via the system bus 170. Moreover, in the present embodiment, this performance information 117 includes damper pedal depression information 118. This damper pedal depression information 118 is also sent to the damper sound effect generator 101. Furthermore, the CPU 103 outputs volume change information to analog amplifiers (not illustrated in the figure). The CPU 103 also outputs the following to the damper sound effect generator 101 via the system bus 170: a pitch control signal 119, a resonant effect reduction amount configuration signal 120, and impulse response waveform data (second sound waveform data) 121*a* and 121*b* that is read from the memory 104. In addition, the CPU 103 outputs a damper pedal effect application amount configuration signal 122 to the multipliers 105 and 106 via the system bus 170.

The memory 104 stores the control programs for operating the CPU 103 and also temporarily stores various types of working data while programs are executed. The memory 104 also stores the impulse response waveform data (second sound waveform data) 121*a* and 121*b*, which respectively correspond to the high note side and the low note side.

The piano sound source 102 stores, in an internal waveform memory (not illustrated in the figure), waveform data obtained by recording sounds produced by pressing the keys of an acoustic piano. In accordance with performance information 117 indicating a note-on instruction from the CPU 103, the piano sound source 102 allocates a free channel from among time-divided sound production channels (or, if there are no free channels, a channel obtained by silencing the oldest channel) and then uses this sound production channel to start reading waveform data for the specified pitch from the internal waveform memory (not illustrated in the figure). In accordance with performance information 117 indicating a note-off instruction from the CPU 103, the piano sound source 102 stops reading the waveform data from the waveform memory to the sound production channel currently producing sound for the specified pitch and then frees that sound production channel. However, when damper pedal depression information 118 indicating that the damper pedal is ON (depressed) is input, even if performance information 117 indicating a note-off instruction is input, the process of reading the waveform data from the waveform memory continues rather than stops.

Here, the piano sound source 102 respectively stores, in the waveform memory, left channel waveform data and right channel waveform data obtained by recording the sounds produced by pressing the keys of an acoustic piano in stereo. Moreover, upon receiving performance information 117 indicating a note-on instruction, the piano sound source 102 respectively allocates a sound production channel for the left channel and a sound production channel for the right channel and then uses the allocated sound production channels to start respectively reading the left channel waveform data and the right channel waveform data from the waveform memory. The piano sound source 102 processes, in a time-divided manner and individually for the left channel and the right channel, the reading of a plurality of sets of waveform data using a plurality of sound production channels corresponding to a plurality of note-on instructions. The piano sound source 102 outputs a plurality of sets of waveform data corresponding to the plurality of note-on instructions and currently being read for the left channel to the adder 107 as first sound waveform data (L-ch) 109, and similarly outputs a plurality of sets of waveform data corresponding to the plurality of note-on instructions and currently being read for the right channel to the adder 108 as first sound waveform data (R-ch) 110. Moreover, the piano sound source 102 outputs the plurality of sets of waveform data corresponding to the plurality of note-on instructions and currently being read for the left channel to the damper sound effect generator 101. Similarly, the piano sound source 102 outputs the plurality of sets of waveform data corresponding to the plurality of note-on instructions and currently being read for the right channel to the damper sound effect generator 101. The piano sound source 102 outputs note number information for sound production channels that were newly allocated in response to the note-on instructions to the damper sound effect generator 101 as sound production channel information 123.

On the basis of the sound production channel information 123 input from the piano sound source 102, for each sound production channel for which the same note number is specified in the first sound waveform data (L-ch) 109 for the left stereo channel input from the piano sound source 102, the damper sound effect generator 101 performs filtering calculation processes (for each key number of 88 keys, for example) of generating attenuated sound waveform data by respectively reducing, from the frequency components included in the waveform data in that sound production channel, the amplitudes of the respective frequency components of the fundamental tone and harmonics of the pitch corresponding to the note number specified for that sound production channel. The damper sound effect generator 101 then performs two mixing processes (one for the high note side and one for the low note side of the keyboard of the piano) for mixing together the outputs of the filtering calculation processes for the 88 keys for the left channel in ratios based on the relationships between the pitches corresponding to the filtering calculation processes and the high note side or the low note side. The damper sound effect generator 101 then performs two convolution operation processes (one for the high note side and one for the low note side) for convolving the waveform data for the left channel output from the respectively corresponding mixing process with left channel impulse response waveform data (second sound waveform data) recorded for both the high note side and the low note side and read from the memory 104. Finally, the outputs of the convolution operation processes are mixed together, and the resulting third sound waveform data (L-ch) 113 for the left channel is output to the multiplier 105. The damper sound effect generator 101 also performs the same processes on the first sound waveform data (R-ch) 110 for the right stereo channel input from the piano sound source 102, and then outputs the resulting third sound waveform data (R-ch) 114 for the right channel to the multiplier 106.

Here, by operating a switch in the switch unit 160, the performer can specify the amount of resonant tone effect to apply when the damper pedal 150 is depressed, and the CPU 103 outputs the specified amount of effect as the damper pedal effect application amount configuration signal 122. On the basis of this damper pedal effect application amount configuration signal 122, the multipliers 105 and 106 respectively control the amplitudes of the third sound waveform data (L-ch) 113 and the third sound waveform data (R-ch) 114 output from the damper sound effect generator 101 in order to determine the respective amounts of resonant tone for the left channel and the right channel.

The adder 107 adds together the first sound waveform data (L-ch) 109 output from the piano sound source 102 and the third sound waveform data (L-ch) 113 output from the damper sound effect generator 101 via the multiplier 105, and then outputs the resulting left channel piano sound waveform data (L-ch) 115 to which the damper pedal effect has been applied. Similarly, the adder 108 adds together the first sound waveform data (R-ch) 110 output from the piano sound source 102 and the third sound waveform data (R-ch) 114 output from the damper sound effect generator 101 via the multiplier 106, and then outputs the resulting right channel piano sound waveform data (R-ch) 116 to which the damper pedal effect has been applied. The piano sound waveform data (L-ch) 115 and the piano sound waveform data (R-ch) 116 are then respectively output to digital-to-analog (D/A) converters, analog amplifiers, and speakers (not illustrated in the figure) to be played as stereo piano ON signals.

Figure 2:
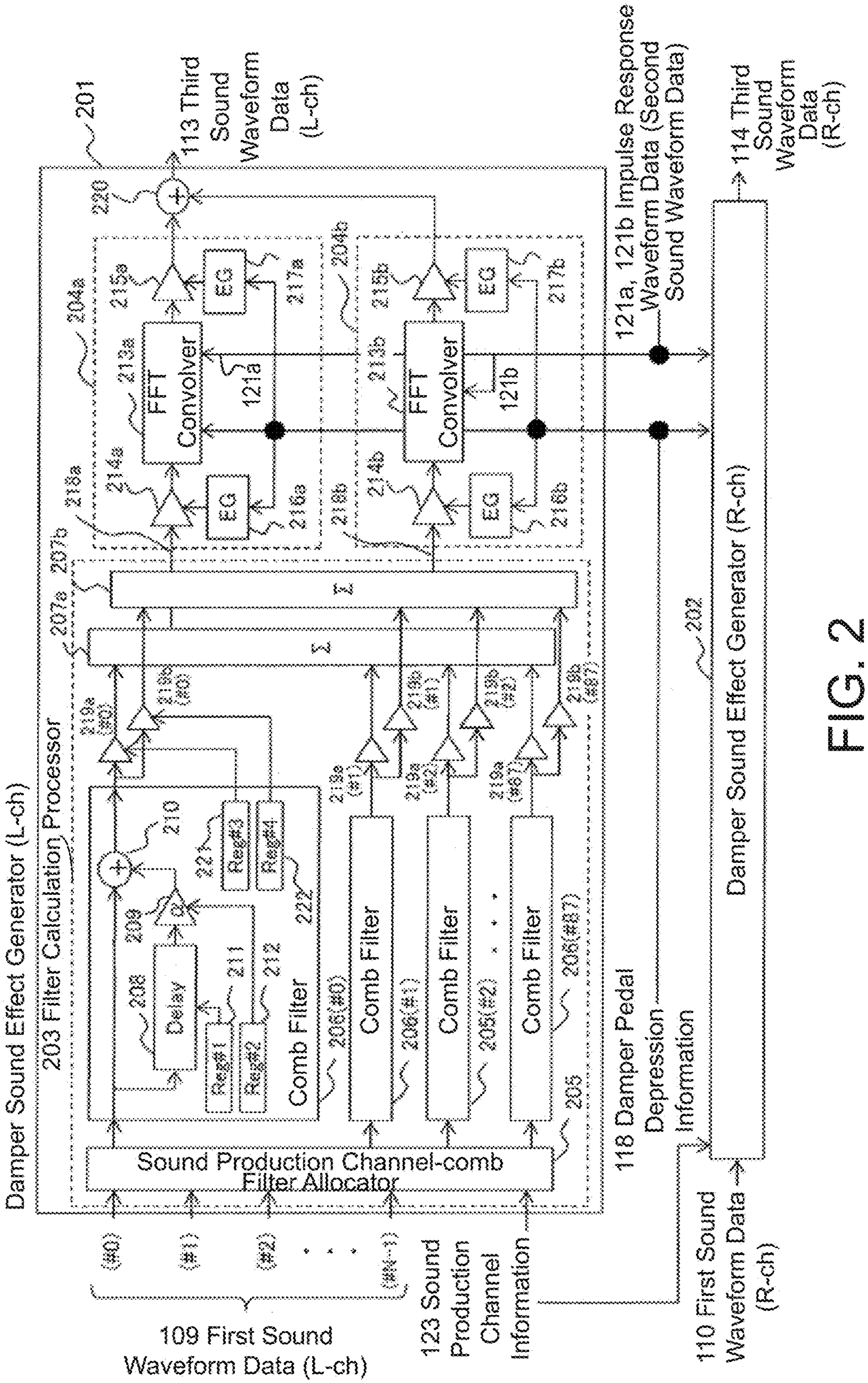
FIG. 2 is a block diagram illustrating an embodiment of a damper sound effect generator.

FIG. 2 is a block diagram illustrating an embodiment of the damper sound effect generator 101 illustrated in FIG. 1. The damper sound effect generator 101 includes a damper sound effect generator (L-ch) 201 that processes the left channel and a damper sound effect generator (R-ch) 202 that processes the right channel. The damper sound effect generator (L-ch) 201 performs processes for generating damper sound effects on the first sound waveform data (L-ch) 109 for the left channel input from the piano sound source 102 illustrated in FIG. 1, and then outputs the resulting third sound waveform data (L-ch) 113 illustrated in FIG. 1 to the multiplier 105. Similarly, the damper sound effect generator (R-ch) 202 performs processes for generating damper sound effects on the first sound waveform data (R-ch) 110 for the right channel input from the piano sound source 102 illustrated in FIG. 1, and then outputs the resulting third sound waveform data (R-ch) 114 illustrated in FIG. 1 to the multiplier 106.

The damper sound effect generator (L-ch) 201 and the damper sound effect generator (R-ch) 202 have the same configuration except in that the inputs and outputs respectively correspond to the left channel and the right channel, and therefore the following description will only focus on the damper sound effect generator (L-ch) 201. The damper sound effect generator (L-ch) 201 includes a filter calculation processor 203, a high note side convolution operation processor 204*a*, and a low note side convolution operation processor 204*b*.

The filter calculation processor 203 includes a sound production channel-comb filter allocator 205, 88 comb filters 206 numbered from #0 (A0) to #87 (C8) and corresponding to the pitches of the 88 keys on the keyboard of an acoustic piano, #0 to #87 high note side multipliers 219*a* that multiply the outputs of the #0 to #87 comb filters 206 with high note side application factors 401*a*, #0 to #87 low note side multipliers 219*b* that similarly multiply the outputs of the #0 to #87 comb filters 206 with low note side application factors 401*b*, a high note side adder 207*a* that adds together (mixes together) the outputs of the #0 to #87 high note side multipliers 219*a* and outputs the addition results as high note side attenuated sound waveform data 218*a*, and a low note side adder 207*b* that similarly adds together (mixes together) the outputs of the #0 to #87 low note side multipliers 219*b* and outputs the addition results as low note side attenuated sound waveform data 218*b*.

The sound production channel-comb filter allocator 205, on the basis of the sound production channel information 123 input from the piano sound source 102, allocates and inputs waveform data that, among sets of waveform data in N note-on instruction-specific sound production channels #0 to #N−1 for the first sound waveform data (L-ch) 109 input from the piano sound source 102 illustrated in FIG. 1, is in sound production channels for which the same note number is specified to the comb filter 206 that, among the 88 comb filters 206 numbered from #0 to #87, corresponds to that note number. Here, the allocation of any waveform data in a sound production channel for the same note number that had previously been allocated to that comb filter 206 is cleared. This means that when the same key on the keyboard 140 illustrated in FIG. 1 is pressed multiple times, the damper effect applied to an earlier keypress is cleared so that the damper effect can be applied to a later keypress.

Each of the 88 comb filters 206 numbered from #0 to #87 performs a filtering calculation process of generating and outputting note number-specific attenuated sound waveform data by respectively reducing, from the frequency components included in the input waveform data, the amplitudes of the respective frequency components of the fundamental tone and harmonics of a pitch corresponding to a note number specified in that waveform data.

As illustrated for the #0 comb filter 206 in FIG. 2, in order to perform this filtering calculation process, the comb filter 206 includes a delayer 208 (indicated by "Delay" in the figure) that delays the input waveform data by a specified delay length (number of samples; hereinafter, this delay length is represented by K), a multiplier 209 that multiplies the output of the delayer 208 by a scaling factor α, and an adder 210 that adds together the input waveform data and the output of the multiplier 209 and then outputs the addition results as the note number-specific attenuated sound waveform data. The comb filter 206 further includes a register Reg#1 211 that stores the pitch control signal 119 specified via the system bus 170 by the CPU 103 illustrated in FIG. 1 and supplies the delay length K to the delayer (Delay) 208, as well as a register Reg#2 212 that stores the resonant effect reduction amount configuration signal 120 similarly specified via the system bus 170 by the CPU 103 and supplies the scaling factor α to the multiplier 209. Furthermore, the comb filter 206 includes a register Reg#3 221 and a register Reg#4 222 that respectively store the high note side application factor and the low note side application factor that are respectively applied to the high note side multiplier 219*a* and the low note side multiplier 219*b*.

The comb filter 206 configured as described above thus forms a feedforward comb filter. In the comb filter 206, letting the input be x[n] and the output (the note number attenuated sound waveform data) be y[n], the comb filter 206 satisfies equation 1 below.

$$y[n]=x[n]+\alpha x[n-K] \qquad \text{<Eq. 1>}$$

Given equation 1, the transfer function for the comb filter 206 can be defined as shown below in equation 2.

$$Y(z)=(1+\alpha z^{-K})X(z) \qquad \text{<Eq. 2>}$$

To obtain the frequency characteristics of a discrete-time system expressed in the z-domain, the substitution $z=e^{j\omega}$ (where e is an exponent, j is a unit complex number, and ω is angular frequency) is made, thereby allowing the transfer function given by equation 2 to be expressed as equation 3 below.

$$H(z)=\frac{Y(z)}{X(z)}=1+\alpha z^{-K}=\frac{z^K+\alpha}{z^K} \qquad \text{<Eq. 3>}$$

Then, using Euler's formula, equation 3 can be rewritten as equation 4.

$$H(e^{j\omega})=\{1+\alpha\cos(\omega K)\}-j\alpha\sin(\omega K) \qquad \text{<Eq. 4>}$$

Therefore, from equation 4, the frequency-amplitude response of the comb filter 206 can also be expressed by equation 5.

$$|H(e^{j\omega})|=\sqrt{(1+\alpha^2)+2\alpha\cos(\omega K)} \qquad \text{<Eq. 5>}$$

Figure 3:
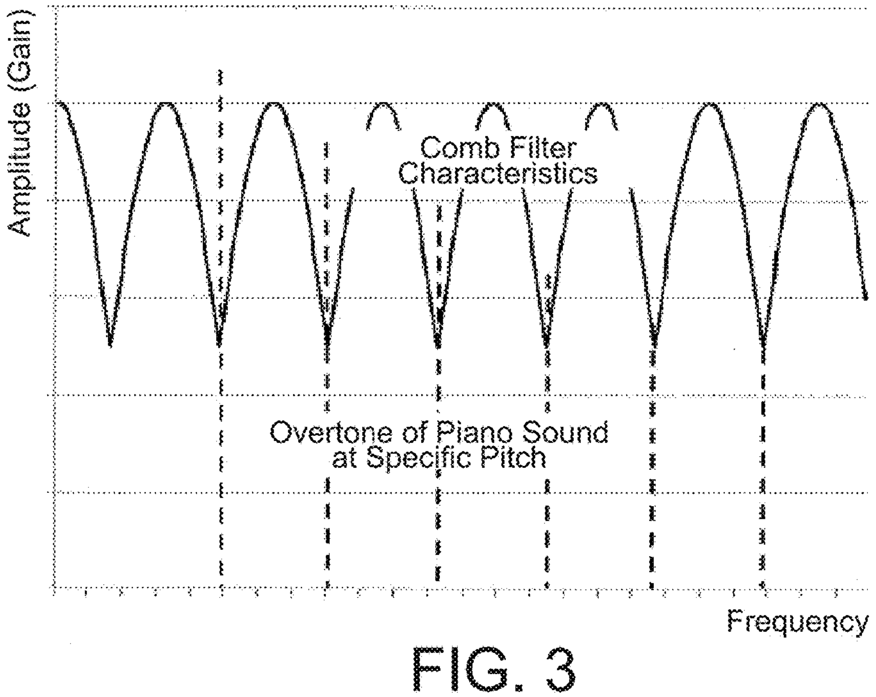
FIG. 3 illustrates an example of the characteristics of a comb filter that attenuates the fundamental resonant tones of strings in recorded piano sounds.

In equation 5, the $(1+\alpha^2)$ term is a constant, while the $2\alpha\cos(\omega K)$ term is a periodic function. Therefore, as illustrated in FIG. 3, the frequency characteristics of the comb filter 206 has periodic zero points. Here, when the delay length K is set to a sample length corresponding to the period of the pitch assigned to the key number (one of #0 to #87) for that comb filter 206, the frequency of the zero points in the frequency characteristics of the comb filter 206 illustrated in FIG. 3 corresponds to the respective frequencies of the fundamental tone and harmonics of the pitch. Thus, the comb filter 206 performs the filtering calculation process of respectively reducing, from the frequency components included in the input waveform data, the amplitudes of the respective frequency components of the fundamental tone and harmonics of the pitch corresponding to the note number specified in that waveform data. As a result, the note number-specific attenuated sound waveform data output from the comb filter 206 exhibits frequency characteristics in which the amplitudes of the respective frequency components of the fundamental tone and harmonics of the pitch assigned to the key number (one of #0 to #87) for that comb filter 206 are respectively reduced.

As described above, the delay length K set to the delayer (Delay) 208 of the comb filter 206 corresponds to the pitch assigned to the key number (one of #0 to #87) for that comb filter 206. However, as also described above, the CPU 103 illustrated in FIG. 1 can supply this pitch information in advance via the system bus 170 as the pitch control signal 119. The pitch is determined by the pitch frequency of the key corresponding to the key number, the temperament setting specified by the performer, and the master tuning setting similarly specified by the performer. As will be described in more detail later (see the description of FIG.

7C), any time when the electronic musical instrument 100 illustrated in FIG. 1 is powered on, when the performer changes the temperament, or when the performer changes the master tuning, the CPU 103 recalculates the pitch information corresponding to each of the comb filters 206 and then sets this information to the register Reg#1 211 of each comb filter 206 as the pitch control signal 119.

Moreover, from equation 5 above, changing the scaling factor α set to the multiplier 209 makes it possible to change the depth of the zero points in the frequency characteristics illustrated in FIG. 3. The amount by which the amplitudes of the respective frequency components of the fundamental tone and harmonics of the pitch assigned to a key number should be respectively reduced varies depending on the key number. Therefore, for each of the comb filters 206, the CPU 103 sets the scaling factor α corresponding to the key number assigned to that comb filter 206 to the register Reg#2 212 of that comb filter 206 via the system bus 170 as the resonant effect reduction amount configuration signal 120.

For the sets of waveform data that are allocated by the sound production channel-comb filter allocator 205 and in which note numbers corresponding to the pitches of the key numbers #0 to #87 in the first sound waveform data (L-ch) 109 input from the piano sound source 102 are specified, the #0 to #87 comb filters 206 respectively generate and output note number-specific attenuated sound waveform data by respectively reducing, from the frequency components included in that waveform data, the amplitudes of the respective frequency components of the fundamental tones and harmonics of the pitches corresponding to the note numbers specified in that waveform data.

Figure 4:
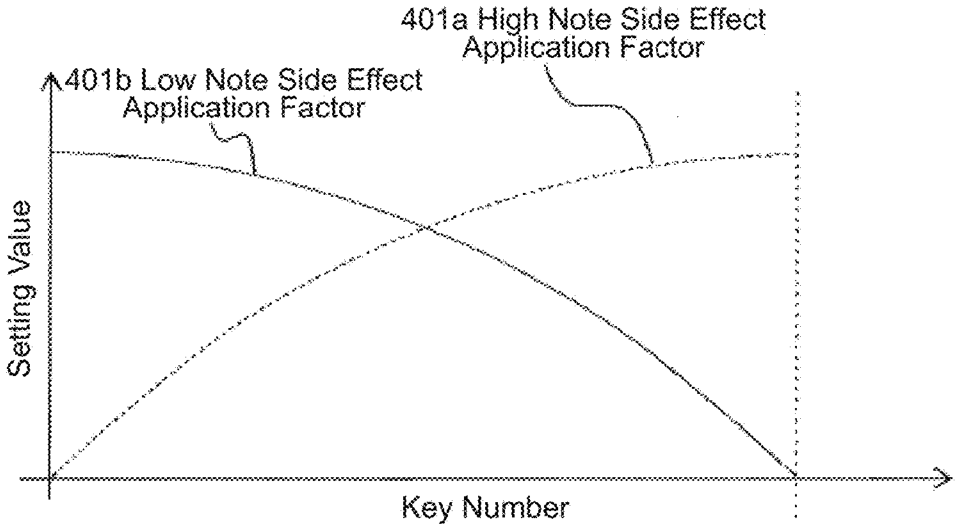
FIG. 4 illustrates an example of characteristics for settings for a high note side application factor and a low note side application factor.

The #0 to #87 high note side multipliers 219*a* respectively multiply the sets of note number-specific attenuated sound waveform data output from the #0 to #87 comb filters 206 with the high note side application factors applied from the registers Reg#3 221 in the comb filters 206, and then output the results to the high note side adder 207*a*. Similarly, the #0 to #87 low note side multipliers 219*b* respectively multiply the sets of note number-specific attenuated sound waveform data output from the #0 to #87 comb filters 206 with the low note side application factors applied from the registers Reg#4 222 in the comb filters 206, and then output the results to the low note side adder 207*b*. Here, the settings for the high note side application factors that are set to the registers Reg#3 221 of the #0 to #87 comb filters 206 are determined, for each of the key numbers associated with the #0 to #87 comb filters 206, on the basis of characteristics such as those in the example illustrated in FIG. 4. The lower the key number is, the lower the value of the setting determined for the high note side application factor is, and conversely, the higher the value of the setting determined for the low note side application factor is. The higher the key number is, the higher the value of the setting determined for the high note side application factor is, and conversely, the lower the value of the setting determined for the low note side application factor is.

The high note side adder 207*a* adds together (mixes together) the outputs of the #0 to #87 high note side multipliers 219*a* and outputs the addition results to the high note side convolution operation processor 204*a* as the high note side attenuated sound waveform data 218*a*. Similarly, the low note side adder 207*b* adds together (mixes together) the outputs of the #0 to #87 low note side multipliers 219*b* and outputs the addition results to the low note side convolution operation processor 204*b* as the low note side attenuated sound waveform data 218*b*.

In FIG. 2, when the performer depresses the damper pedal 150 illustrated in FIG. 1, the high note side convolution operation processor 204*a* performs a process of convolving the high note side attenuated sound waveform data 218*a* output from the high note side adder 207*a* in the filter calculation processor 203 with the left channel high note side impulse response waveform data (second sound waveform data) 121*a* read from the memory 104. Similarly, when the performer depresses the damper pedal 150 illustrated in FIG. 1, the low note side convolution operation processor 204*b* performs a process of convolving the low note side attenuated sound waveform data 218*b* output from the low note side adder 207*b* in the filter calculation processor 203 with the left channel low note side impulse response waveform data (second sound waveform data) 121*b* read from the memory 104. An adder 220 then generates the third sound waveform data (L-ch) 113 by adding together (mixing together) the output waveform data from the high note side convolution operation processor 204*a* and the low note side convolution operation processor 204*b*.

In order to implement the process described above, the high note side convolution operation processor 204*a* includes a Fast Fourier transform (FFT) convolver 213*a*, a multiplier 214*a* arranged on the input side of the FFT convolver 213*a*, a multiplier 215*a* arranged on the output side of the FFT convolver 213*a*, and envelope generators (EGs) 216*a* and 217*a* that respectively generate scaling factor change information for the multipliers 214*a* and 215*a*. Similarly, the low note side convolution operation processor 204*b* includes an FFT convolver 213*b*, a multiplier 214*b* arranged on the input side of the FFT convolver 213*b*, a multiplier 215*b* arranged on the output side of the FFT convolver 213*b*, and EGs 216*b* and 217*b* that respectively generate scaling factor change information for the multipliers 214*b* and 215*b*. The FFT convolvers 213*a* and 213*b*, the multipliers 214*a* and 214*b*, the multipliers 215*a* and 215*b*, the EGs 216*a* and 216*b*, and the EGs 217*a* and 217*b* respectively have the same configurations except in that the data processed is for the left channel and for the right channel.

The FFT convolver 213*a* stores, in an internal register, impulse response data corresponding to impulse responses obtained by sampling string vibration and body characteristics on the high note side of an acoustic piano while depressing the damper pedal. Similarly, the FFT convolver 213*b* stores, in an internal register, impulse response data corresponding to impulse responses obtained by sampling string vibration and body characteristics on the low note side of the acoustic piano while depressing the damper pedal. Furthermore, the FFT convolver 213*a* performs an operation process of convolving the high note side attenuated sound waveform data 218*a* output from the high note side adder 207*a* in the filter calculation processor 203 with the high note side impulse response data, and then outputs the resulting high note side resonant tone waveform data. Similarly, the FFT convolver 213*b* performs an operation process of convolving the low note side attenuated sound waveform data 218*b* output from the low note side adder 207*b* in the filter calculation processor 203 with the low note side impulse response data, and then outputs the resulting low note side resonant tone waveform data.

Here, in order to produce the behavior for when the performer depresses the damper pedal 150 illustrated in FIG. 1, the high note side convolution operation processor 204*a* utilizes the multipliers 214*a* and 215*a* arranged before and after the FFT convolver 213*a* as well as the EGs 216*a* and 217*a* that control the multiplication factors of the multipliers 214*a* and 215*a* to manipulate the volume before and after the FFT convolver 213*a*. Similarly, in order to produce the behavior for when the performer depresses the damper pedal 150, the low note side convolution operation processor 204*b* utilizes the multipliers 214*b* and 215*b* arranged before and after the FFT convolver 213*b* as well as the EGs 216*b* and 217*b* that control the multiplication factors of the multipliers 214*b* and 215*b* to manipulate the volume before and after the FFT convolver 213*b*. When the performer depresses the damper pedal 150, the CPU 103 inputs damper pedal depression information 118 indicating that the damper pedal is ON to the EGs 216*a*, 217*a*, 216*b*, and 217*b* via the system bus 170. Conversely, when the performer releases the damper pedal 150, the CPU 103 inputs damper pedal depression information 118 indicating that the damper pedal is OFF to the EGs 216*a*, 217*a*, 216*b*, and 217*b* via the system bus 170. The EGs 216*a*, 217*a*, 216*b*, and 217*b* generate envelope values for when the damper pedal is ON and envelope values for when the damper pedal is OFF in accordance with the damper pedal depression information 118 and then respectively apply these values to the multipliers 214*a*, 215*a*, 214*b*, and 215*b*. In this way, the amount of damper pedal effect for when the damper pedal is ON or OFF is controlled with the multipliers 214*a*, 215*a*, 214*b*, and 215*b*. In an acoustic piano, the impulse length of the resonance from string vibration is relatively long (several dozen seconds, for example), and therefore here, if only the multipliers 215*a* and 215*b* on the output sides of the FFT convolver 213*a* and the FFT convolver 213*b* are present, any residual sound in the FFT convolver 213*a* or the FFT convolver 213*b* could potentially be output again. To prevent this, the multipliers 214*a* and 214*b* are also arranged on the input sides of the FFT convolver 213*a* and the FFT convolver 213*b* to control the amount of damper pedal effect.

Figure 5:
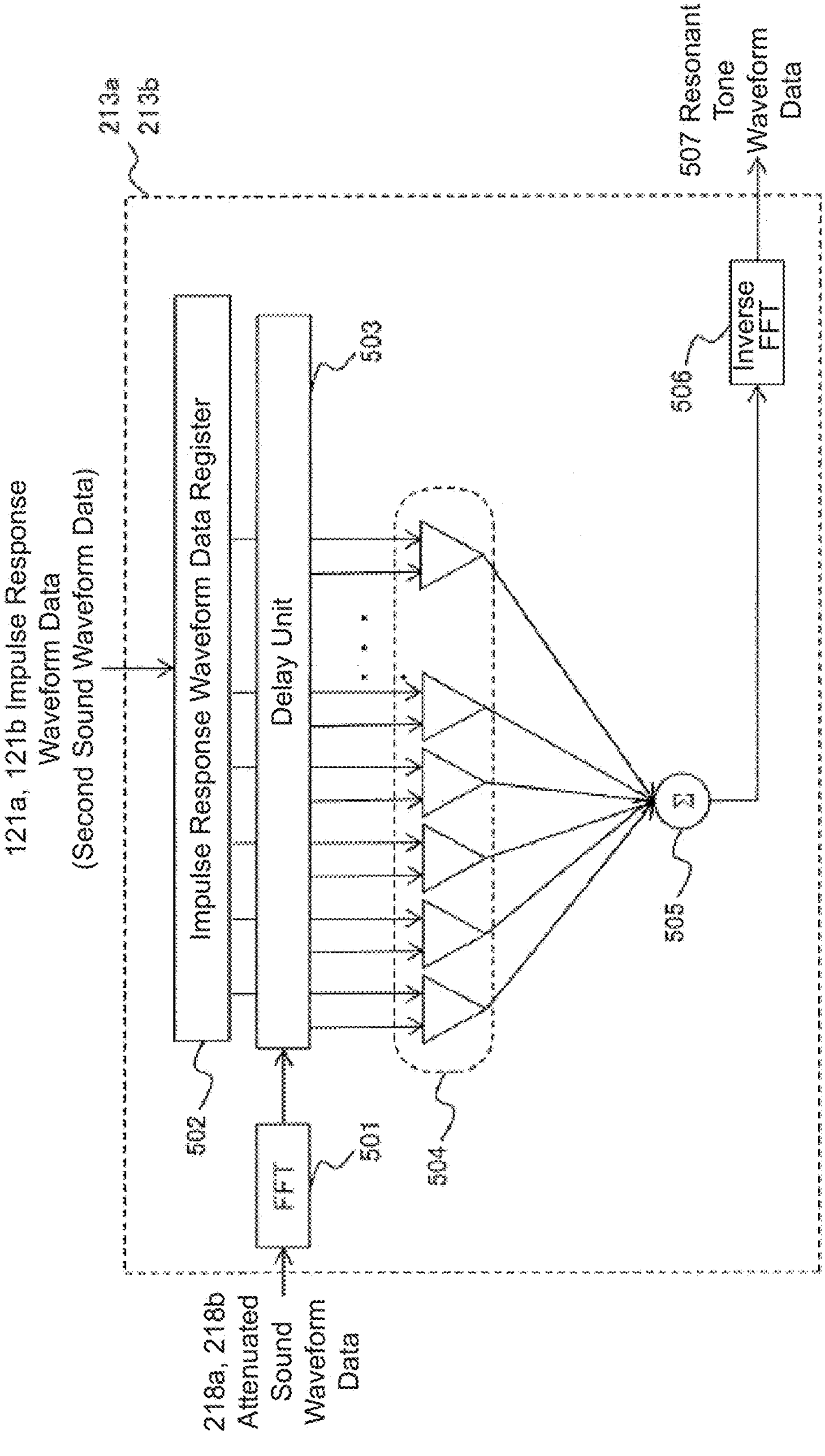
FIG. 5 is a block diagram illustrating an example of an embodiment of an FFT convolver.

FIG. 5 is a block diagram illustrating an example of an embodiment of the FFT convolver 213*a* or 213*b* illustrated in FIG. 2. The FFT convolver 213*a* or 213*b* includes an FFT processor 501, an impulse response waveform data register 502, a delay unit 503, a complex multiplier 504, a complex adder 505, and an inverse FFT processor 506.

The FFT processor 501 performs an FFT calculation on the high note side attenuated sound waveform data 218*a* or the low note side attenuated sound waveform data 218*b* that is input.

The impulse response waveform data register 502 stores impulse response complex number frequency waveform data 121*a* or 121*b* sent from the memory 104 via the system bus 170 by the CPU 103 illustrated in FIG. 1.

The delay unit 503 stores complex number frequency waveform data from the FFT processor 501 while shifting that data by an analysis frame unit or half of that unit.

The complex multiplier 504, in accordance with equation 6 below, and for each frequency, performs complex multiplication of the impulse response frequency waveform data stored in the impulse response waveform data register 502 with the frequency waveform data stored in the delay unit 503.

$$out\cdot r = in1\cdot r \times in2\cdot r - in1\cdot i \times in2\cdot i$$

$$out\cdot i = in1\cdot i \times in2\cdot r - in1\cdot r \times in2\cdot i \quad \text{<Eq. 6>}$$

The complex adder 505 calculates the complex sum of the multiplication results from the complex multiplier 504.

Then, the inverse FFT processor 506 performs an inverse FFT calculation on the output of the complex adder 505 to generate resonant tone waveform data 507 and then outputs this data to the multiplier 215*a* or 215*b* illustrated in FIG. 2.

Figure 6:
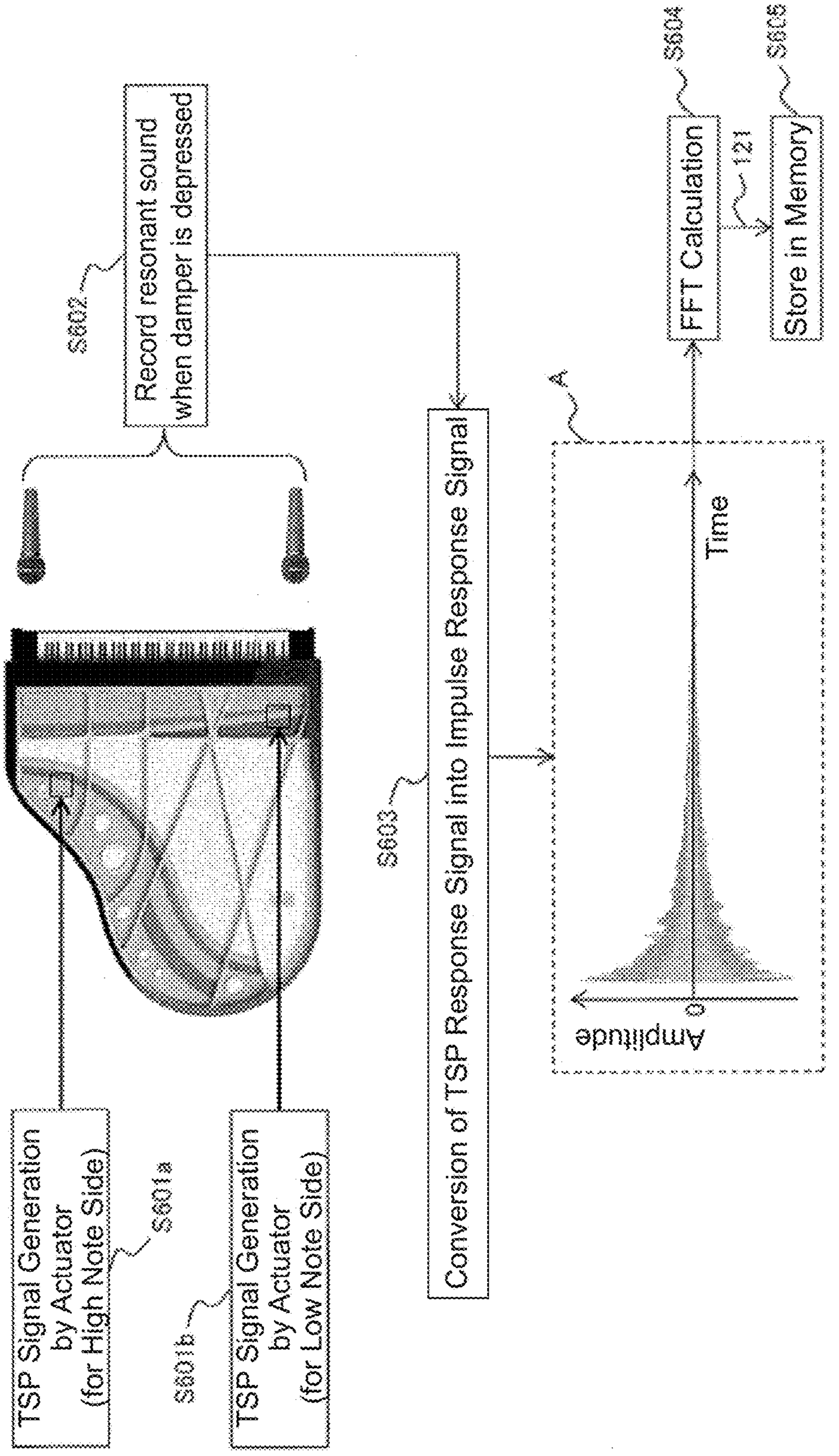
FIG. 6 is an explanatory drawing of a method of recording impulse response waveform data (second sound waveform data).

FIG. 6 is an explanatory drawing of a method of recording the impulse response waveform data (second sound waveform data). A high note side actuator and a low note side actuator that cause the body of an acoustic piano to vibrate are arranged on the high note side and the low note side of a frame that supports the strings of the acoustic piano, and these actuators are driven separately to generate separate time-stretched pulse (TSP) signals for the high note side and the low note side (S601*a* and S601*b* in FIG. 6).

The sound produced from the body of the acoustic piano due to TSP signals separately generated for the high note side and for the low note side while depressing the damper pedal is separately recorded for the high note side and the low note side using two stereo microphones (S602 in FIG. 6). Although it would also be conceivable to make the actuators generate impulse signals and then directly record the resulting pulse responses, this would require the microphone gain and maximum actuator drive capability to be excessively large as well as present challenges related to signal-to-noise ratio (S/N), and therefore TSP signals are used. TSPs are a type of sweep waveform signal generated by shifting the phase of an impulse for each frequency. TSPs make it possible to disperse drive times for a certain period of time and are therefore effective for solving the problems described above. Moreover, impulse hammers may be used instead of the actuators to drive the piano. Furthermore, the number and positions of the microphones that record the produced sound may be different from those illustrated in FIG. 6, and TSP signals recorded at a plurality of locations above or below the soundboard and then mixed together may be used.

The shifted phases of the recorded TSP signals are inverse-shifted to obtain time-domain impulse response signals of the type shown in A in FIG. 6 (S603 in FIG. 6). These impulse response signals are obtained separately for the high note side and for the low note side.

FFT calculations are respectively performed separately for the high note side and for the low note side on the obtained time-domain impulse response signals (S604 in FIG. 6), thereby yielding the high note side impulse response waveform data (second sound waveform data) 121*a* and the low note side impulse response waveform data (second sound waveform data) 121*b*, which are complex number signals in the frequency domain, and which are then stored in the memory 104 illustrated in FIG. 1 (S605 in FIG. 6).

FIGS. 7A to 7D are flowcharts illustrating examples of processes in the electronic musical instrument 100 illustrated in FIG. 1 that are related to generating damper sound effects. These processes are operations resulting from the execution of the control programs stored in the memory 104 by the CPU 103 illustrated in FIG. 1.

FIG. 7A is a flowchart illustrating an example of a damper pedal ON interrupt process executed when the performer depresses the damper pedal 150 illustrated in FIG. 1. When this interrupt occurs, the CPU 103, via the system bus 170, inputs damper pedal depression information 118 indicating that the damper pedal is ON to the EGs 216 and 217 (see FIG. 2) in the convolution operation processors 204 in the damper sound effect generator (L-ch) 201 and the damper sound effect generator (R-ch) 202 included in the damper sound effect generator 101 (see FIG. 1) (step S700 in FIG. 7A). The CPU 103 then returns from the interrupt. Due to this process, the EGs 216 and 217, in accordance with the damper pedal depression information 118 indicating the damper pedal ON instruction, respectively generate and apply the envelope values to the multipliers 214 and 215.

FIG. 7B is a flowchart illustrating an example of a damper pedal OFF interrupt process executed when the performer releases the damper pedal 150 illustrated in FIG. 1 from the depressed state. When this interrupt occurs, the CPU 103, via the system bus 170, inputs damper pedal depression information 118 indicating that the damper pedal is OFF to the EGs 216 and 217 (see FIG. 2) in the convolution operation processors 204 in the damper sound effect generator (L-ch) 201 and the damper sound effect generator (R-ch) 202 included in the damper sound effect generator 101 (see FIG. 1) (step S710 in FIG. 7B). The CPU 103 then returns from the interrupt. Due to this process, the EGs 216 and 217, in accordance with the damper pedal depression information 118 indicating the damper pedal OFF instruction, respectively generate and apply the envelope values to the multipliers 214 and 215.

FIG. 7C is a flowchart illustrating an example of an interrupt process for when the performer operates the switch unit 160 to power on, change the temperament of, or change the master tuning of the electronic musical instrument 100 illustrated in FIG. 1. When any of these interrupts occur, the CPU 103 recalculates the pitches corresponding to the key numbers #0 to #87 in accordance with the respective key numbers and the changed temperament or master tuning, and then, in accordance with the recalculated pitches, recalculates the delay length K for the delayer (Delay) 208 in each of the comb filters 206 corresponding to the key numbers #0 to #87 illustrated in FIG. 2 (step S720 in FIG. 7C). Moreover, the changed temperament information and master tuning information are stored in a non-volatile memory (not illustrated in the figures), and then when the interrupt triggered by powering on the electronic musical instrument 100 occurs, the temperament information and the master tuning information stored in the non-volatile memory are used for the recalculations described above.

The CPU 103 then, via the system bus 170, sets, as the pitch control signal 119, the recalculated delay length K for each comb filter 206 to the register Reg#1 211 in each of the comb filters 206 in the damper sound effect generator (L-ch) 201 and the damper sound effect generator (R-ch) 202 included in the damper sound effect generator 101 (see FIG. 1) (step S721 in FIG. 7C).

Moreover, when the interrupt triggered by powering on the electronic musical instrument 100 occurs, the CPU 103 reads the scaling factors α for the multipliers 209 in the comb filters 206 corresponding to the key numbers #0 to #87 illustrated in FIG. 2 from a read-only memory (ROM), for example (not illustrated in the figures), and then, via the system bus 170, sets these scaling factors, as the resonant effect reduction amount configuration signal 120, to the registers Reg#2 212 (see FIG. 2) in the comb filters 206 in the damper sound effect generator (L-ch) 201 and the damper sound effect generator (R-ch) 202 included in the damper sound effect generator 101 (see FIG. 1) (step S722 in FIG. 7C). The CPU 103 then returns from the interrupt.

FIG. 7D is a flowchart illustrating an example of an interrupt process for when the performer operates the switch unit 160 to change the amount of damper pedal effect to apply. When this interrupt occurs, the CPU 103 sets the damper pedal effect application amount configuration signal 122 configured with the changed application amount to the multipliers 105 and 106 (see FIG. 1) via the system bus 170. The CPU 103 then returns from the interrupt. Thus, the application amount is changed in the third sound waveform data (L-ch) 113 and the third sound waveform data (R-ch) 114 (that is, the resonant tones for the damper pedal effect from the damper sound effect generator 101) that are respectively added into the piano sound waveform data (L-ch) 115 and the piano sound waveform data (R-ch) 116 by the adders 107 and 108 illustrated in FIG. 1.

The embodiment described above utilizes a method based on convolving resonant tone characteristics sampled directly from an acoustic piano to generate and add together the correct damper sound effects, thereby making it possible to obtain piano damper sounds and piano sounds that are more natural, realistic, and beautiful.

Although in the embodiment described above the convolution operation processes were performed divided into two types, the high note side and the low note side, the convolution operation processes may be performed divided into more types. In such a case, for the impulse response waveform data (second sound waveform data) 121 that is stored in the memory 104 in advance, a plurality of types of data corresponding to the divided types may be stored and selected from.

Although the embodiment described above outputs two-channel stereo musical notes, the output does not necessarily need to be stereo output, or the output may be three or more channel stereo output.

In the embodiment described above, the number of comb filters 206 prepared matches the 88 keys #0 to #87 corresponding to the number of strings in a standard acoustic piano. However, when the amount of delay is long, such as for bass strings, a configuration in which the delay lengths K for the delayers (Delay) 208 are set to half the periods of the pitches corresponding to the key numbers or a configuration in which some of the comb filters are shared for other strings may be used.

Although the embodiment described above uses FFT calculations as an example of the convolution operation processes performed by the convolution operation processors 204, the convolution operation processes may alternatively be performed by direct multiplication-accumulation of the waveform data in the time domain without using FFTs.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A musical note generation device, comprising:

a plurality of keys, the plurality of keys respectively being associated with pitch information; and at least one processor, the at least one processor performing the following processes:

an attenuated sound waveform data generation process of generating attenuated sound waveform data by respectively reducing, among frequency components included in first sound waveform data corresponding to the pitch information associated with a specified key, amplitudes of respective frequency components of a fundamental tone and harmonics of the fundamental tone corresponding to a pitch indicated by the pitch information;

a convolution operation process that convolves the attenuated sound waveform data generated by the attenuated sound waveform data generation process with second sound waveform data corresponding to at least one of a higher pitch side impulse response and a lower pitch side impulse response, so as to generate third sound waveform data, the higher pitch side impulse response having relatively higher pitch components than the lower pitch side impulse response; and an output process of outputting piano sound waveform data generated on the basis of the third sound waveform data generated by the convolution operation process.

2. The musical note generation device according to claim 1, wherein the first sound waveform data includes at least a sound obtained from vibration of a string struck due to a keypress being performed while not depressing a damper pedal in a keyboard instrument, and wherein the second sound waveform data are impulse response waveform data for resonant tones obtained from vibration of a plurality of strings included in the keyboard instrument that is caused by vibrating at least one of a higher pitch side and a lower pitch side of the keyboard instrument while depressing the damper pedal of the keyboard instrument, the higher pitch side of the keyboard instrument generating relatively higher pitch sounds than the lower pitch side of the keyboard instrument.

3. The musical note generation device according to claim 1, wherein said plurality of keys is grouped into a plurality of higher pitch keys and a plurality of lower pitch keys that are associated with pitches lower than pitches associated with the plurality of higher pitch keys, and wherein in the convolution operation process, when a key of the plurality of lower pitch keys is pressed, the attenuated sound waveform data is convolved with the second sound waveform data corresponding to the lower pitch side impulse response, and when a key of the plurality of higher pitch keys is pressed, the attenuated sound waveform data is convolved with the second sound waveform data corresponding to the higher pitch side impulse response.

4. The musical note generation device according to claim 1, wherein in the attenuated sound waveform data generation process, the at least one processor identifies the respective frequency components of the fundamental tone and the harmonics with a comb filter.

5. The musical note generation device according to claim 1, wherein in the attenuated sound waveform data generation process, the at least one processor generates the attenuated sound waveform data by performing a delay process corresponding to the specified key on the first sound waveform data.

6. The musical note generation device according to claim 1, wherein the at least one processor performs the attenuated sound waveform data generation process, the convolution operation process, and the output process when a damper pedal is depressed.

7. A musical note generation device, comprising:

a plurality of keys, the plurality of keys respectively being associated with pitch information; and at least one processor, the at least one processor performing processes including:

an attenuated sound waveform data generation process of generating attenuated sound waveform data by respectively reducing, among frequency components included in first sound waveform data corresponding to the pitch information associated with a specified key, amplitudes of respective frequency components of a fundamental tone and harmonics of the fundamental tone corresponding to a pitch indicated by the pitch information;

a convolution operation process that convolves the attenuated sound waveform data generated by the attenuated sound waveform data generation process with second sound waveform data corresponding to at least one of a higher pitch side impulse response and a lower pitch side impulse response, so as to generate third sound waveform data, the higher pitch side impulse response having relatively higher pitch components than the lower pitch side impulse response; and an output process of outputting piano sound waveform data generated on the basis of the third sound waveform data generated by the convolution operation process.

8. The musical note generation device according to claim 7, wherein the at least one processor performs the following processes:

in the attenuated sound waveform data generation process, a process of generating first attenuated sound waveform data by multiplying, by a higher pitch side effect application factor, sound waveform data in which the amplitudes of the respective frequency components of the fundamental tone and harmonics are respectively reduced, and a process of generating second attenuated sound waveform data by multiplying, by a lower pitch side effect application factor, the sound waveform data in which the amplitudes of the respective frequency components of the fundamental tone and harmonics are respectively reduced, and in the convolution operation process, a process of convolving the first attenuated sound waveform data with the second sound waveform data corresponding to the higher pitch side impulse response, a process of convolving the second attenuated sound waveform data with the second sound waveform data corresponding to the lower pitch side impulse response, and a process of generating the third sound waveform data from the respectively convolved sound waveform data.

9. An electronic musical instrument, comprising:

a damper pedal; and the musical note generation device as set forth in claim 1, wherein the at least one processor of the musical note generating device performs the attenuated sound waveform data generation process, the convolution operation process, and the output process when the damper pedal is depressed.

10. A method to be executed by a processor in an electronic musical instrument, comprising:

an attenuated sound waveform data generation process of generating attenuated sound waveform data by respectively reducing, among frequency components included in first sound waveform data corresponding to pitch information associated with a specified key, amplitudes of respective frequency components of a fundamental tone and harmonics of the fundamental tone corresponding to a pitch indicated by the pitch information;

a convolution operation process that convolves the attenuated sound waveform data generated by the attenuated sound waveform data generation process with second sound waveform data corresponding to at least one of a higher pitch side impulse response and a lower pitch side impulse response, so as to generate third sound waveform data, the higher pitch side impulse response having relatively higher pitch components than the lower pitch side impulse response; and an output process of outputting piano sound waveform data generated on the basis of the third sound waveform data generated by the convolution operation process.

11. A non-transitory storage medium having stored therein instructions that cause a processor in an electronic musical instrument to perform the following processes:

an attenuated sound waveform data generation process of generating attenuated sound waveform data by respectively reducing, among frequency components included in first sound waveform data corresponding to pitch information associated with a specified key, amplitudes of respective frequency components of a fundamental tone and harmonics of the fundamental tone corresponding to a pitch indicated by the pitch information;

a convolution operation process that convolves the attenuated sound waveform data generated by the attenuated sound waveform data generation process with second sound waveform data corresponding to at least one of a higher pitch side impulse response and a lower pitch side impulse response, so as to generate third sound waveform data, the higher pitch side impulse response having relatively higher pitch components than the lower pitch side impulse response; and an output process of outputting piano sound waveform data generated on the basis of the third sound waveform data generated by the convolution operation process.

* * * * *